US012697913B2

(12) United States Patent (10) Patent No.: US 12,697,913 B2

Vyskocil et al. (45) Date of Patent: Aug. 4, 2026

(54) CUPHOLDER SYSTEM FOR A VEHICLE

(71) Applicant: JAGUAR LAND ROVER LIMITED, Whitley (GB)

(72) Inventors: Henry Vyskocil, Whitley (GB); Spencer Greening, Whitley (GB); John Dutton, Whitley (GB); Alexander Gray, Whitley (GB); Luke Tighe, Whitley (GB); Brett Townsend, Whitley (GB); John Heath, Whitley (GB); Andy Polson, Whitley (GB); Ben Phyall, Whitley (GB); Sam Soar, Whitley (GB); Joseph Wharton, Whitley (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 300 days.

(21) Appl. No.: 18/702,680

(22) PCT Filed: Oct. 10, 2022

(86) PCT No.: PCT/EP2022/078129

§ 371 (c)(1),
(2) Date: Apr. 18, 2024

(87) PCT Pub. No.: WO2023/066703

PCT Pub. Date: Apr. 27, 2023

(65) Prior Publication Data

US 2024/0409017 A1 Dec. 12, 2024

(30) Foreign Application Priority Data

Oct. 22, 2021 (GB) ..................................... 2115174

(51) Int. Cl.
*B60N 3/10* (2006.01)

(52) U.S. Cl.
CPC ..................................... *B60N 3/102* (2013.01)

(58) Field of Classification Search
CPC ............................ B60N 3/102; B64D 11/0638
See application file for complete search history.

(56) References Cited

U.S. PATENT DOCUMENTS

| | | |
|---|---|---|
| 2009/0095764 A1 | 4/2009 | Schaal |
| 2012/0104011 A1 | 5/2012 | Tsunoda |

(Continued)

FOREIGN PATENT DOCUMENTS

| | | |
|---|---|---|
| CN | 202782811 U | 3/2013 |
| CN | 111532211 A | 8/2020 |

(Continued)

OTHER PUBLICATIONS

Great Britain Intellectual Property Office, Combined Search and Examination Report Issued in Application No. GB2115174.1, Mar. 25, 2022, 8 pages.

(Continued)

*Primary Examiner* — Lori Lyjak

(74) *Attorney, Agent, or Firm* — McCoy Russell LLP

(57) ABSTRACT

A cupholder system for a vehicle includes: a cupholder assembly comprising a first cupholder opening; a lid configured to, when in a closed position, cover at least the first cupholder opening, and when in an open position, uncover the first cupholder opening; and an actuation system configured to, in dependence on an electrical signal, deploy the lid in a first path to the open position and deploy the cupholder assembly in a second path from a stowed position to a deployed position.

18 Claims, 9 Drawing Sheets

(56)                    References Cited

U.S. PATENT DOCUMENTS

| | | | |
|---|---|---|---|
| 2015/0274383 | A1 | 10/2015 | Sawada et al. |
| 2018/0360195 | A1 | 12/2018 | Seguin et al. |
| 2021/0114500 | A1 | 4/2021 | Davis et al. |

FOREIGN PATENT DOCUMENTS

| | | | | | |
|---|---|---|---|---|---|
| CN | 111923838 | A | 11/2020 | | |
| CN | 112918354 | A | 6/2021 | | |
| CZ | 214293 | A3 * | 5/1994 | ............. | B60N 3/102 |
| DE | 112016003404 | T5 * | 4/2018 | .............. | B60Q 3/64 |
| EP | 1486374 | A1 | 12/2004 | | |
| JP | 2007283791 | A | 11/2007 | | |
| WO | 2021254487 | A1 | 12/2021 | | |

OTHER PUBLICATIONS

ISA European Patent Office, International Search Report and Written Opinion Issued in Application No. PCT/EP2022/078129, Feb. 7, 2023, WIPO, 13 pages.
European Patent Office, Office Action Issued in Application No. 22801407.2, Jul. 23, 2025, Germany, 7 pages.

* cited by examiner

CUPHOLDER SYSTEM FOR A VEHICLE

CROSS REFERENCE TO RELATED APPLICATIONS

The present application is a U.S. National Phase of International Application No. PCT/EP2022/078129 entitled "CUPHOLDER SYSTEM FOR A VEHICLE," and filed on Oct. 10, 2022. International Application No. PCT/EP2022/078129 claims priority to Great Britain Patent Application No. 2115174.1 filed on Oct. 22, 2021. The entire contents of each of the above-listed applications are hereby incorporated by reference for all purposes.

TECHNICAL FIELD

The present disclosure relates to a cupholder system for a vehicle. In particular, but not exclusively it relates to a vehicle centre console cupholder system and a vehicle.

BACKGROUND

It is known for vehicles to comprise cupholders for holding cups or bottles. Some cupholders are covered by lids, which can be slid open by a user.

SUMMARY OF THE INVENTION

It is an aim of the present invention to address disadvantages associated with the prior art.

Aspects and embodiments of the invention provide a cupholder system, a vehicle centre console and a vehicle as claimed in the appended claims.

According to an aspect of the invention there is provided a cupholder system for a vehicle, the cupholder system comprising: a cupholder assembly comprising a first cupholder opening; a lid configured to, when in a closed position, cover at least the first cupholder opening, and when in an open position, uncover the first cupholder opening; and an actuation system configured to, in dependence on an electrical signal, deploy the lid in a first path to the open position and deploy the cupholder assembly in a second path from a stowed position to a deployed position.

An advantage is increased convenience for the user, because both movements occur without user intervention and because the cupholder assembly can be presented to the user.

The lid in the closed position may be at a flush position relative to a first plane, and wherein the first cupholder opening in the deployed position is substantially at the flush position.

The lid in the closed position may be above the cupholder assembly. The first cupholder opening in the stowed position may be below the lid. The first cupholder opening in the deployed position may be above the stowed position.

An advantage is that the cupholder assembly in the deployed position is less recessed, or not recessed at all.

The first path of the lid to the open position may comprise rotation of the lid, and the second path of the cupholder assembly may comprise translation of the cupholder assembly.

At the open position of the lid, an edge of the lid may be substantially flush with an edge of the cupholder assembly at the deployed position.

The actuation system may comprise a shared actuator and a mechanism configured to link the shared actuator to the lid and to the cupholder assembly.

An advantage is reduced componentry.

The cupholder system may comprise an object retainer surface curved so that in use as the lid rotates between the closed position and the open position, a proximal edge of the lid proximal to the object retainer surface moves at a substantially constant distance from the object retainer surface, wherein when the lid is at the open position, the object retainer surface and the lid remain separated from each other by the substantially constant distance.

An advantage is convenience because loose objects can be left on the lid without sliding off the lid when the lid is tilted.

The cupholder system may comprise a controller configured to, during movement of the lid to the open position, detect an interference against moving the lid to the open position, and to interrupt movement of the lid in response to the detection. Interrupting movement of the lid may comprise leaving the lid in a partially open position until a resume signal is received.

An advantage is convenience because the user can reach in and retrieve the interfering object, while the lid is partially open.

The cupholder assembly may comprise a second cupholder opening, wherein the lid in the closed position may further cover the second cupholder opening, wherein the lid in the open position may expose the first and second cupholder openings, and wherein the deployment of the cupholder assembly may cause at least the first and second cupholder openings to move.

According to an aspect of the invention there is provided an apparatus for a vehicle, the apparatus comprising: a lid for a cabin accessory, wherein the lid in a closed position is substantially horizontal, wherein the lid at an open position is rotated relative to horizontal and uncovers the cabin accessory; an actuation system configured to, in dependence on an electrical signal, deploy the lid in a first path to the open position; and an object retainer surface curved so that in use as the lid rotates between the closed position and the open position, a proximal edge of the lid proximal to the object retainer surface moves at a substantially constant distance from the object retainer surface, wherein when the lid is at the open position, the object retainer surface and the lid remain separated from each other by the substantially constant distance.

According to an aspect of the invention there is provided a vehicle centre console comprising the cupholder system.

The vehicle centre console may comprise a user input device section located aft of the cupholder system, closer to a seat than the cupholder system. The user input device section may enable a user to request movement of the table by the actuation system.

According to an aspect of the invention there is provided a vehicle comprising the cupholder system or the vehicle centre console.

Within the scope of this application it is expressly intended that the various aspects, embodiments, examples and alternatives set out in the preceding paragraphs, in the claims and/or in the following description and drawings, and in particular the individual features thereof, may be taken independently or in any combination that falls within the scope of the appended claims. That is, all embodiments and/or features of any embodiment can be combined in any way and/or combination that falls within the scope of the appended claims, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
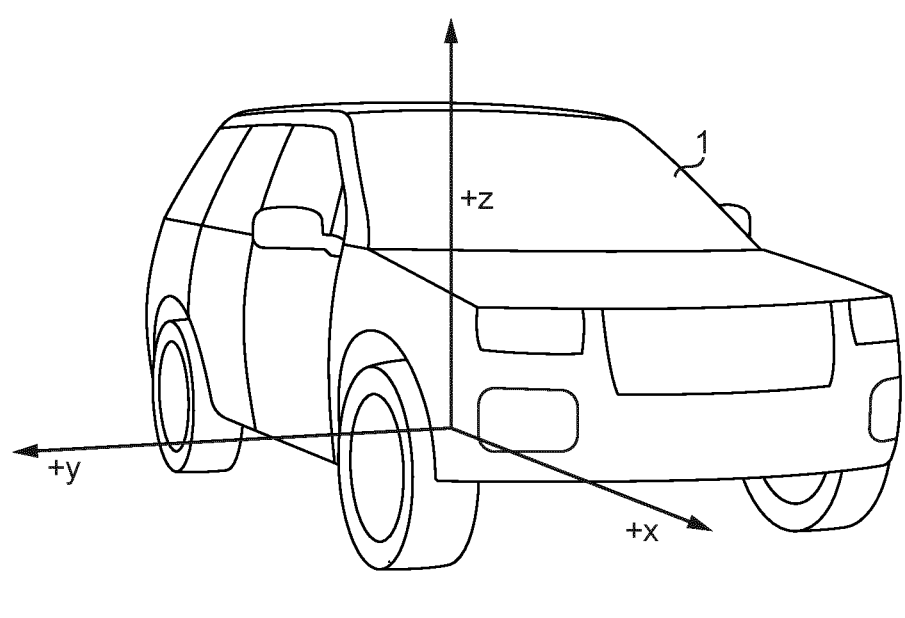
FIG. 1 illustrates an example of a vehicle.

FIG. 1 illustrates an example of a vehicle 1 in which embodiments of the invention can be implemented. In some, but not necessarily all examples, the vehicle 1 is a passenger vehicle, also referred to as a passenger car or as an automobile. In other examples, embodiments of the invention can be implemented for other applications, such as commercial vehicles.

FIG. 1 is a front perspective view and illustrates a longitudinal x-axis between the front and rear of the vehicle 1 representing a centreline, an orthogonal lateral y-axis between left and right lateral sides of the vehicle 1, and a vertical z-axis. A forward/fore direction typically faced by a driver's seat is in the positive x-direction; rearward/aft is-x. A rightward direction as seen from the driver's seat is in the positive y-direction; leftward is-y. These are a first lateral direction and a second lateral direction.

Figure 2:
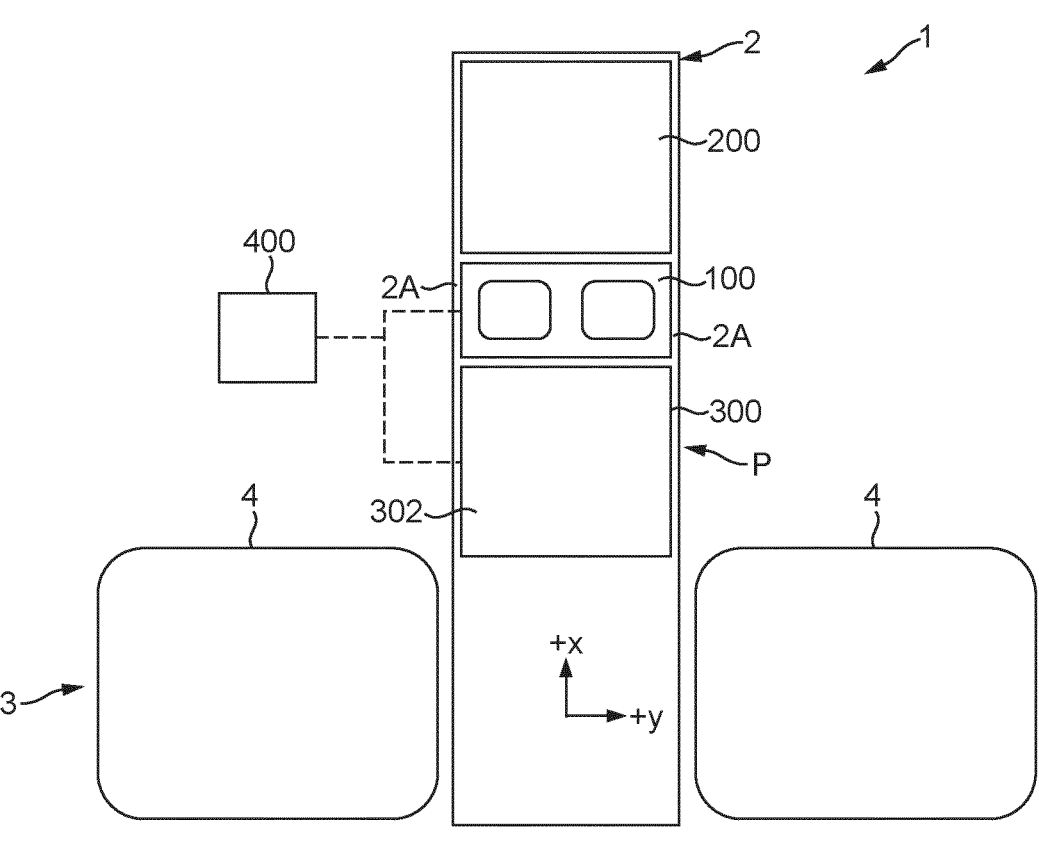
FIG. 2 illustrates an example of a vehicle centre console and a row of seats.

FIG. 2 schematically illustrates an example of a vehicle centre console 2 in plan view. The vehicle centre console 2 can be located between seats 4 in a row 3 of seats 4 of the vehicle 1. The vehicle centre console 2 may extend along the x-axis. The vehicle centre console 2 may extend along a centreline of the vehicle 1.

In some examples, the row 3 of seats 4 is other than a front row of seats of the vehicle 1 comprising a driver's seat. The row 3 of seats 4 may be aft of another row of seats of the vehicle 1. For example, the row 3 of seats 4 may comprise a first rear row of seats 4 or (if present) a second rear row of seats 4.

The vehicle centre console 2 comprises various accessories for the convenience of occupants of those seats 4.

Optionally, the vehicle centre console 2 extends between the seats 4 in lieu of a centre seat.

The vehicle centre console 2 can comprise sections (e.g., openings) for receiving various accessories during assembly, including at least a cupholder system 100 as defined herein. In some examples, the vehicle centre console 2 can further comprise a user input device section 300 for the installation of a user input device 302 such as a touchscreen display. The user input device 302 may be located aft of the cupholder system 100, as shown in FIG. 2, so is convenient to reach from the seats 4. In some examples, the vehicle centre console 2 can comprise a table system 200. The table system 200 may be located fore of the cupholder system 100.

The features of the cupholder system 100 will now be described with reference to FIGS. 3-10.

The cupholder system 100 comprises a cupholder assembly 101. The cupholder assembly 101 comprises a body formed from one or more parts. The cupholder assembly 101 comprises a first cupholder opening 102 and a second cupholder opening 104. The first and second cupholder openings 102, 104 may be implemented as apertures in a top surface 115 of the cupholder assembly 101.

In some examples, the cupholder assembly 101 comprises a cupholder base 103 beneath the first cupholder opening 102. In some examples, the first cupholder opening 102 is coupled to the cupholder base 103 by a cupholder side wall 105 of the cupholder assembly 101. In another example, the cupholder side wall 105 is omitted.

In some examples, the cupholder assembly 101 comprises a cupholder base 103 beneath the second cupholder opening 104. In some examples, the second cupholder opening 104 is coupled to the cupholder base 103 by a cupholder side wall 105 of the cupholder assembly 101. In another example, the cupholder side wall 105 is omitted.

At least the top surface 115 of the cupholder assembly 101 is movable between a stowed position SP and a deployed position DP, to move the first and second cupholder openings 102, 104. In some examples, the cupholder system 100 is a movable body comprising the cupholder base(s) 103, cupholder side wall(s) 105 and top surface 115 which can all move together as one unit. In another example, the top surface 115 is movable but the cupholder base(s) 103 is not movable.

In at least some examples, the deployed position DP is above the stowed position SP. In some, but not necessarily all examples, an offset between the deployed position DP and the stowed position SP consists of a substantially vertical offset.

Figure 3:
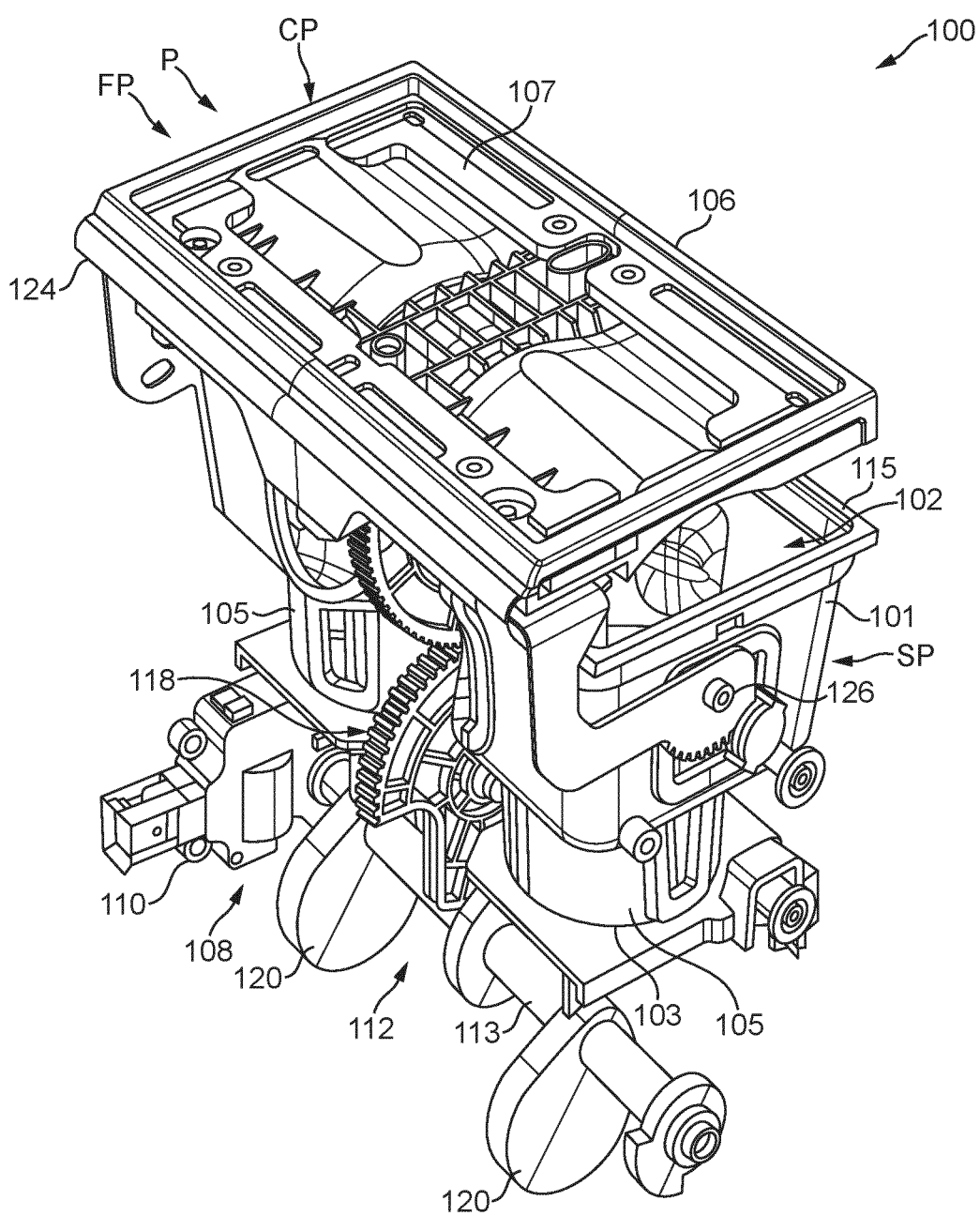
FIG. 3 illustrates a rear perspective view of an example cupholder system, comprising a lid at a closed position and a cupholder assembly at a stowed position.

The cupholder system 100 further comprises a movable lid 106, movable between a closed position CP and an open position OP. The lid 106 is configured to, when in the closed position CP, cover the first and second cupholder openings 102, 104. An example of the closed position CP of the lid 106 is shown in FIG. 3.

The lid 106 in the closed position CP may be above the first and second cupholder openings 102, 104. The lid 106 in the closed position CP may be directly above the cupholder assembly 101. The lid 106 in the closed position CP may be substantially horizontal.

In some examples, the top surface 107 of the lid 106 in the closed position CP is at a flush position FP, occupying part of a first plane P defining an upper exterior surface of the vehicle centre console 2. The first plane P may be an approximately flat and/or horizontal plane. Referring to FIG. 2, the first plane P may be a plane on which a touchscreen surface of the neighbouring user input device 302 is located.

The first plane P may be a plane on which upper peripheral edges 2A of the vehicle centre console 2 are located.

Further, the area and dimensions of the lid 106 may be configured so that the edges of the lid 106 meet the corresponding upper peripheral edges 2A of the vehicle centre console 2 with minimal gaps therebetween.

The flush position FP of the lid 106 ensures a flush finish with minimal gaps or discontinuities between the neighbouring accessories. The terms 'flush finish' and 'minimal gaps' relates to a degree of tolerance understood by the engineer skilled in the art. The planar arrangement of the parts (2A, 302, 114, 115, 107) defining the top surface of the vehicle centre console 2, with minimal gaps, provides a surface that is aesthetic and ergonomic, easily cleanable and resistant to fluid ingress.

Figure 5:
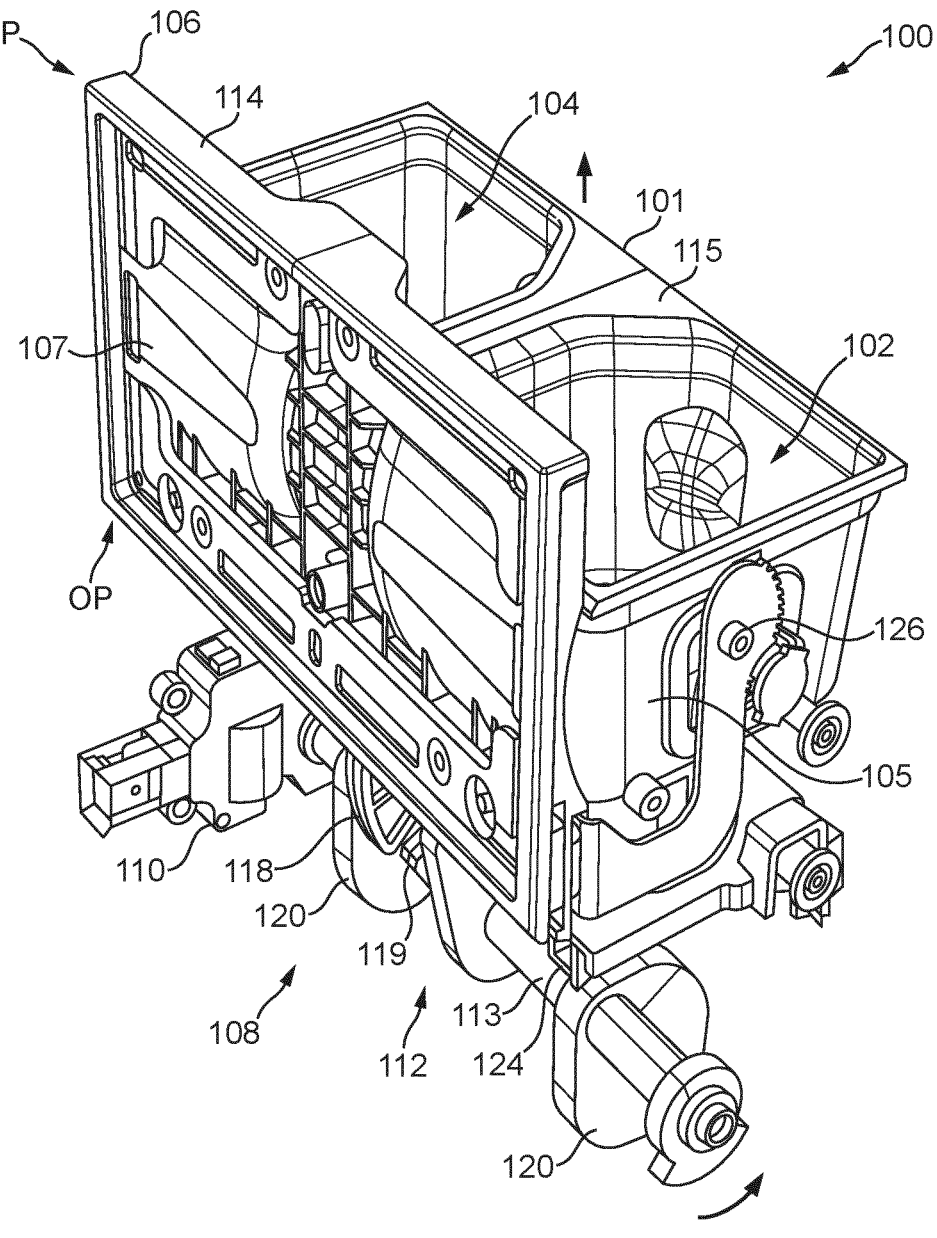
FIG. 5 illustrates the rear perspective view of the example cupholder system, wherein the lid is at the open position.

The lid 106 is configured to, when in the open position OP, uncover (reveal) the first and second cupholder openings 102, 104. An example of the open position OP is shown in FIG. 5. The open position OP of the lid 106 may be an upright or vertical position of the lid 106. The lid 106 may be rotatable from the closed, horizontal position to the open, upright position. The lid 106 in the open position OP may be adjacent the cupholder assembly 101, to the aft side of the cupholder assembly 101 as shown or to the fore side of the cupholder assembly 101.

The top surface 107 of the lid 106 comprises perimeter edges including a first edge 114 and a second edge 124. The first and second edges 114, 124 each extend generally laterally in the y-axis and reside on the first plane P when the lid is in the closed position CP. When the lid 106 is in the closed position CP, one of the first and second edges 114, 124 is a fore edge of the lid 106 and the other is an aft edge of the lid 106. However, when the lid 106 is upright in the open position OP, the first edge 114 is above the second edge 124.

Figure 6:
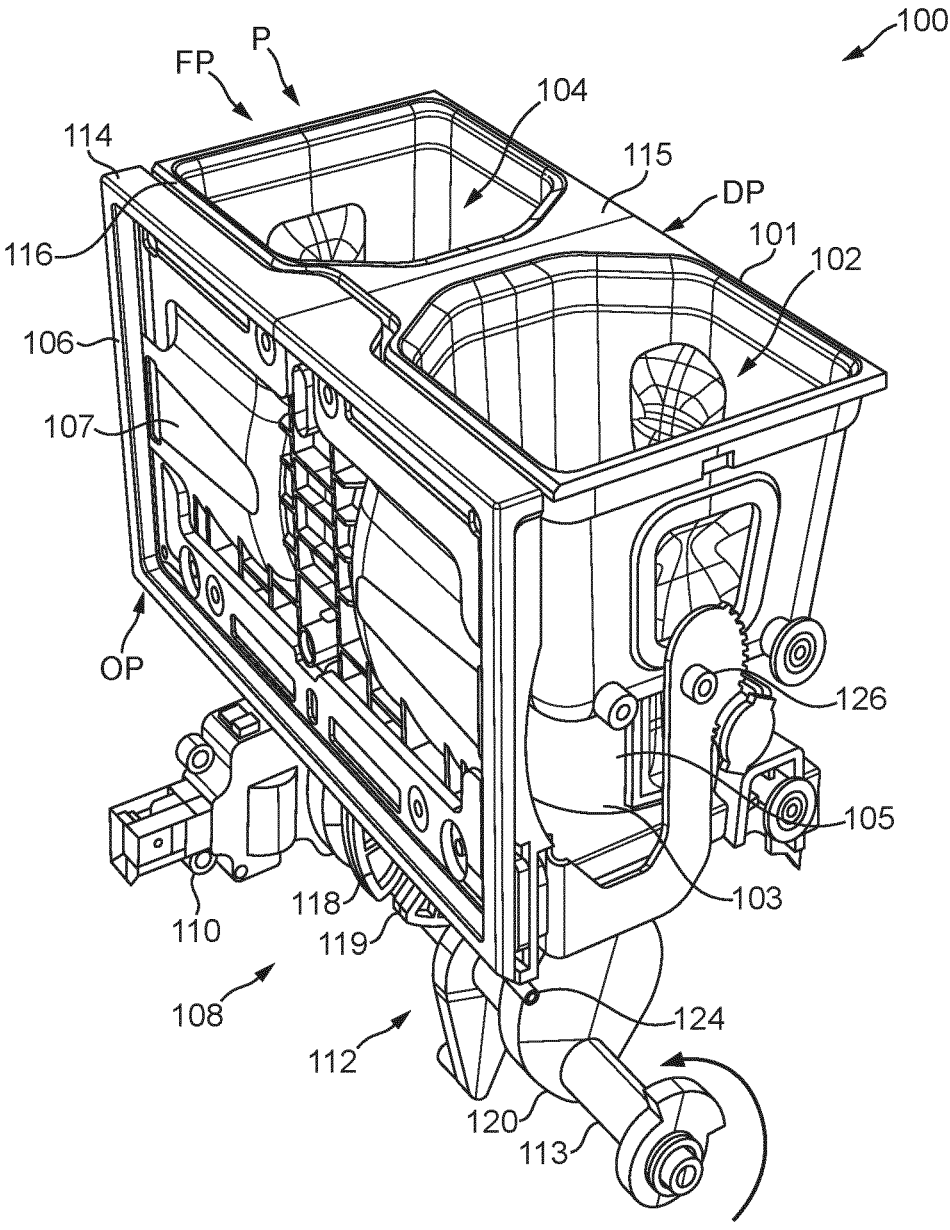
FIG. 6 illustrates the rear perspective view of the example cupholder system, wherein the lid is at the open position and the cupholder assembly is at a deployed position.

In at least some examples, if the lid 106 is in the open position OP, the cupholder assembly 101 can be moved up from the stowed position SP to the deployed position DP. This is shown in FIG. 6. However, if the lid 106 is in the closed position CP, the cupholder assembly 101 cannot be moved up to the deployed position DP.

At the deployed position DP, the top surface 115 of the cupholder assembly 101, including the first and second cupholder openings 102, 104, may be at the flush position FP that the lid 106 was in before the lid 106 was opened. This ensures that a flush finish is maintained regardless of the state of the cupholder system 100.

The top surface 115 of the cupholder assembly 101 may further have substantially the same area and dimensions as the top surface 107 of the lid 106. This ensures that when the cupholder assembly 101 is at the deployed position DP, there are minimal gaps between the edges of the top surface 115 of the cupholder assembly 101 and upper peripheral edges 2A of the vehicle centre console 2.

Further, when the lid 106 is at the open position OP and the cupholder assembly 101 is at the deployed position DP, the first edge 114 of the lid 106 may be substantially flush with a closest edge 116 of the top surface 115 of the cupholder assembly 101, the closest edge 116 being the edge closest to (adjacent/parallel to) the first edge 114. The first edge 114 of the upright lid 106 may be at the flush position FP on the first plane P to maintain a flush finish and to avoid a gap or step The cupholder system 100 further comprises an actuation system 108 comprising one or more actuators 110 and a mechanism 112. The actuation system 108 is configured to, in dependence on an electrical signal, deploy (move) the lid 106 in a first path from the closed
    position CP to the open position OP and deploy (move) the cupholder assembly 101 in a second path from the stowed position SP to the deployed position DP. The second path is different from the first path.

Figure 4:
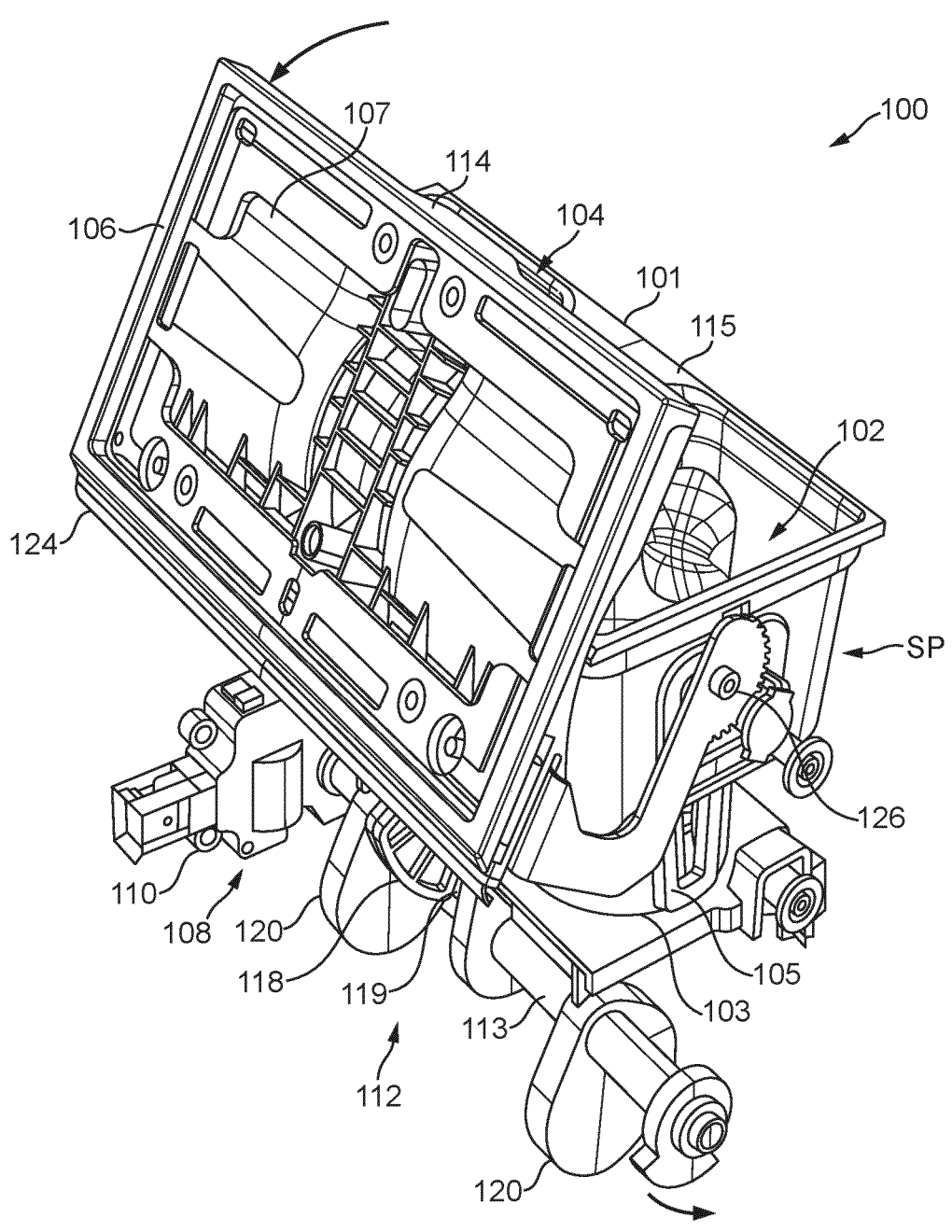
FIG. 4 illustrates the rear perspective view of the example cupholder system, wherein the lid is between closed and open positions.

In the example of FIGS. 3-10, the first path followed by the lid 106 comprises rotation of the lid 106 away from the horizontal position (closed position CP), to the upright or vertical position (open position OP). This is more space efficient than horizontal sliding of the lid 106 because it reduces the area swept by the lid 106 and enables neighbouring accessories, such as the user input device 302, to be located directly adjacent the cupholder system 100 and on a common first plane P. FIGS. 3, 4 and 5 in sequence illustrate the rotational motion of the lid 106.

The axis of rotation 126 of the lid 106 may be static, or in other examples may move due to combined rotation and translation.

In the example of FIGS. 3-10, the second path followed by the cupholder assembly 101 comprises translation of the cupholder assembly 101. The translation of the cupholder assembly 101 can comprise vertical translation. The cupholder assembly 101 may be liftable to the deployed position DP.

The electrical signal received by the actuation system 108 may comprise a control signal received from a controller 400, an example of which is schematically illustrated in FIG. 2. The controller 400 may comprise at least one processor, and at least one memory including computer program code, the at least one processor with the at least one memory and the computer program code configured to perform one or more of the functions described herein.

The electrical signal may be initiated in dependence on detection of a user input provided to the user input device 302. The user input device 302 may provide a user input control for operating the cupholder system 100, for initiating the electrical signal. Upon user actuation of the user input control, the cupholder system 100 may actuate automatically, i.e., without user intervention.

In some examples, a single electrical signal, in response to a single user input, causes the actuation system 108 to move the lid 106 from the closed position CP to the open position OP, and then to move the cupholder assembly 101 from the stowed position SP to the deployed position DP, in sequence.

In some examples, the actuation system 108 is further configured to, in dependence on a second electrical signal, move the cupholder assembly 101 from the deployed position DP to the stowed position SP, and then move the lid 106 from the open position OP to the closed position CP, in sequence. The second electrical signal may be in response to a user input of a different user input control for 'deactivating' (closing) the cupholder system 100.

The actuation system 108 can be implemented in different ways. The actuation system 108 can efficiently comprise a shared actuator 110 and a mechanism 112 configured to link the shared actuator 110 to the lid 106 and to the cupholder assembly 101. Alternatively, separate actuators can be provided.

The actuator 110 can comprise an electric motor with a rotational output, for example.

The mechanism 112 can be implemented in various different ways. According to the illustrated example, the mechanism 112 comprises a shaft 113 coupled to the actuator 110. The shaft 113 is coupled to a lid mover 118 and to a cupholder assembly mover 120.

The cupholder assembly mover 120 can comprise one or more cams or any other appropriate lifting device. The cupholder assembly 101 may rest on the cams and may be lifted and lowered based on rotation of the cams. The word 'cam' is understood to further encompass eccentrics and other equivalents.

Figure 8:
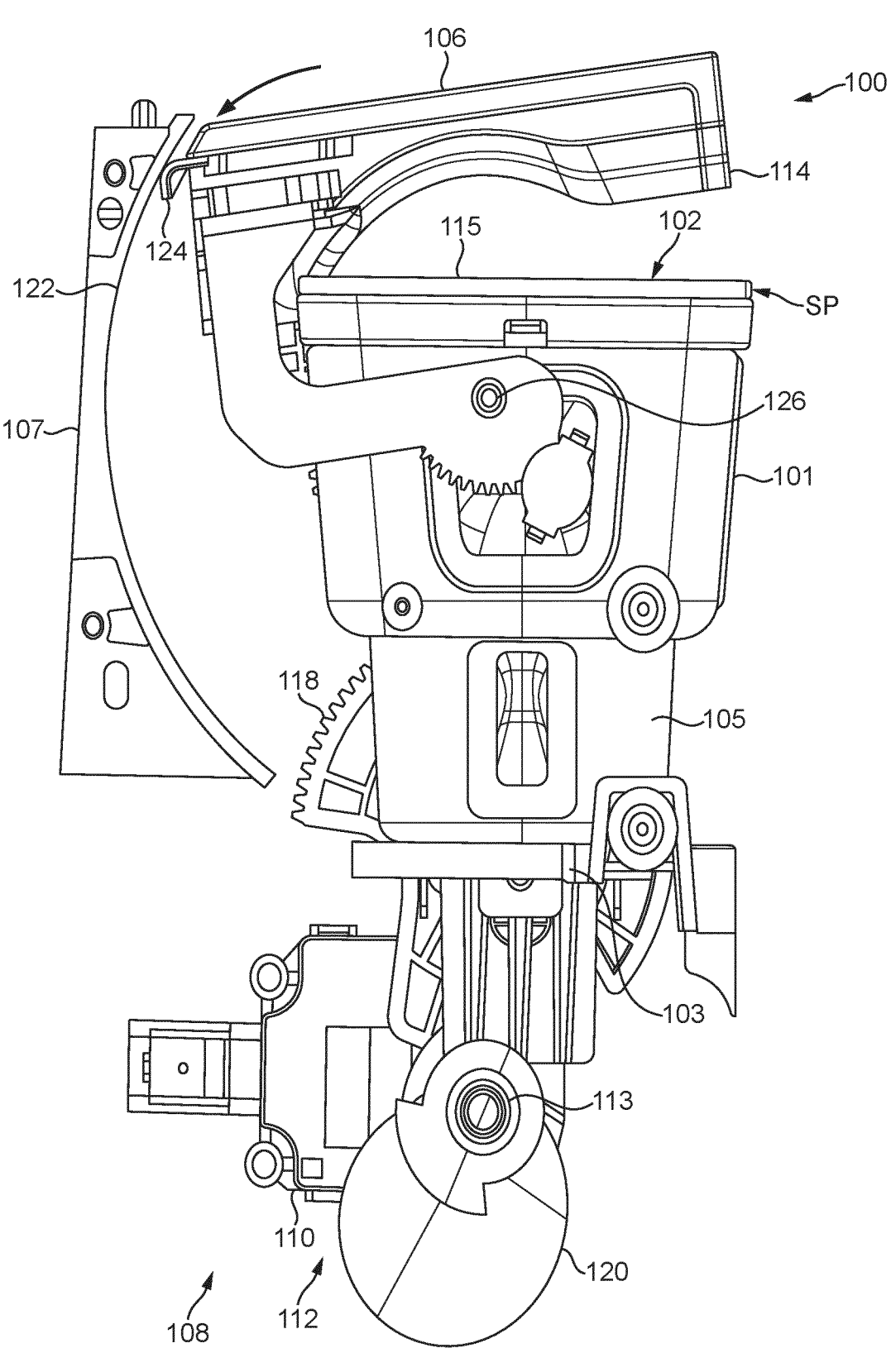
FIG. 8 illustrates a side cross-section view of the example cupholder system, wherein the lid is between the closed and open positions.
Figure 9:
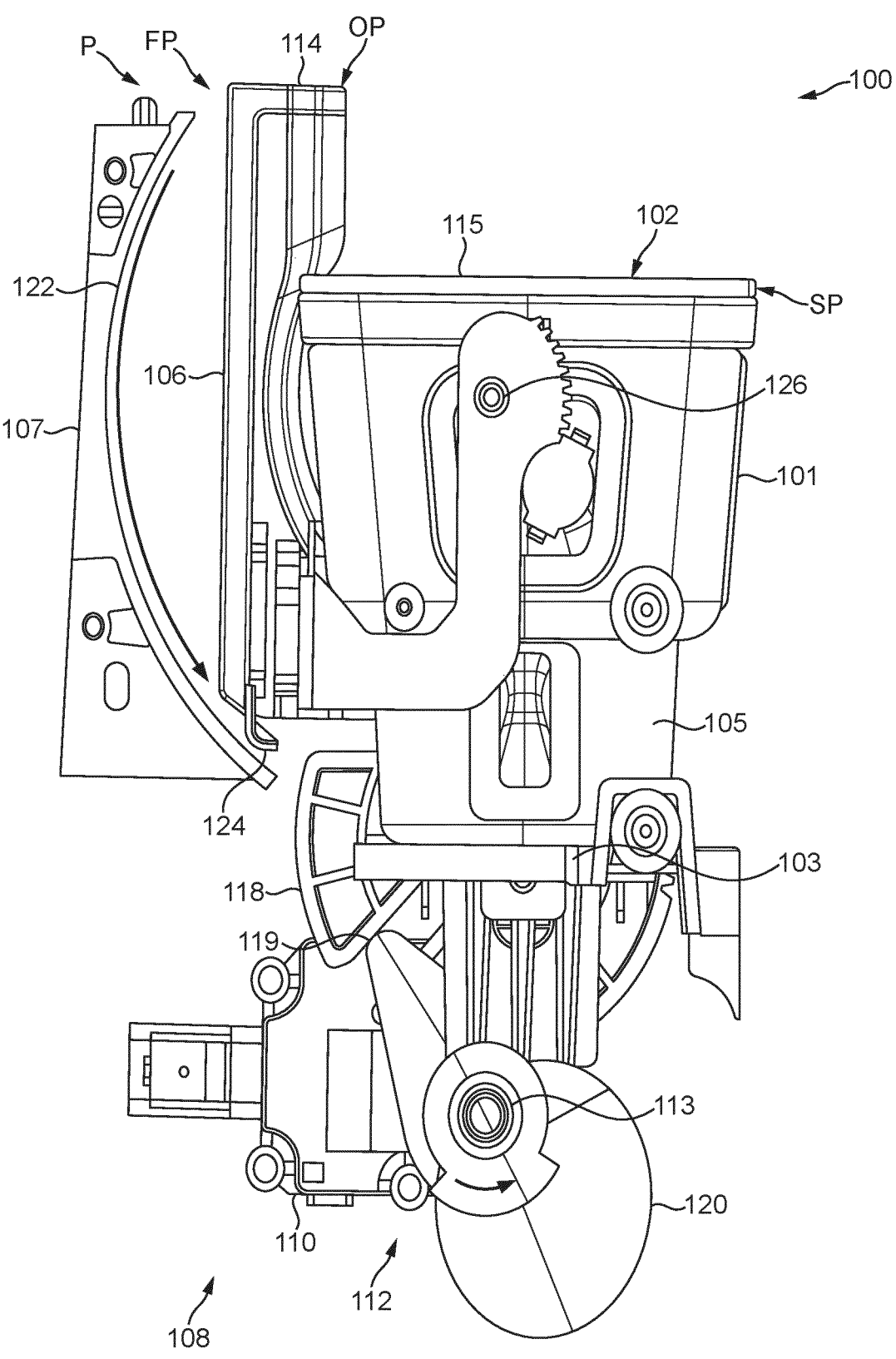
FIG. 9 illustrates the side cross-section view of the example cupholder system, wherein the lid is at the open position.
Figure 10:
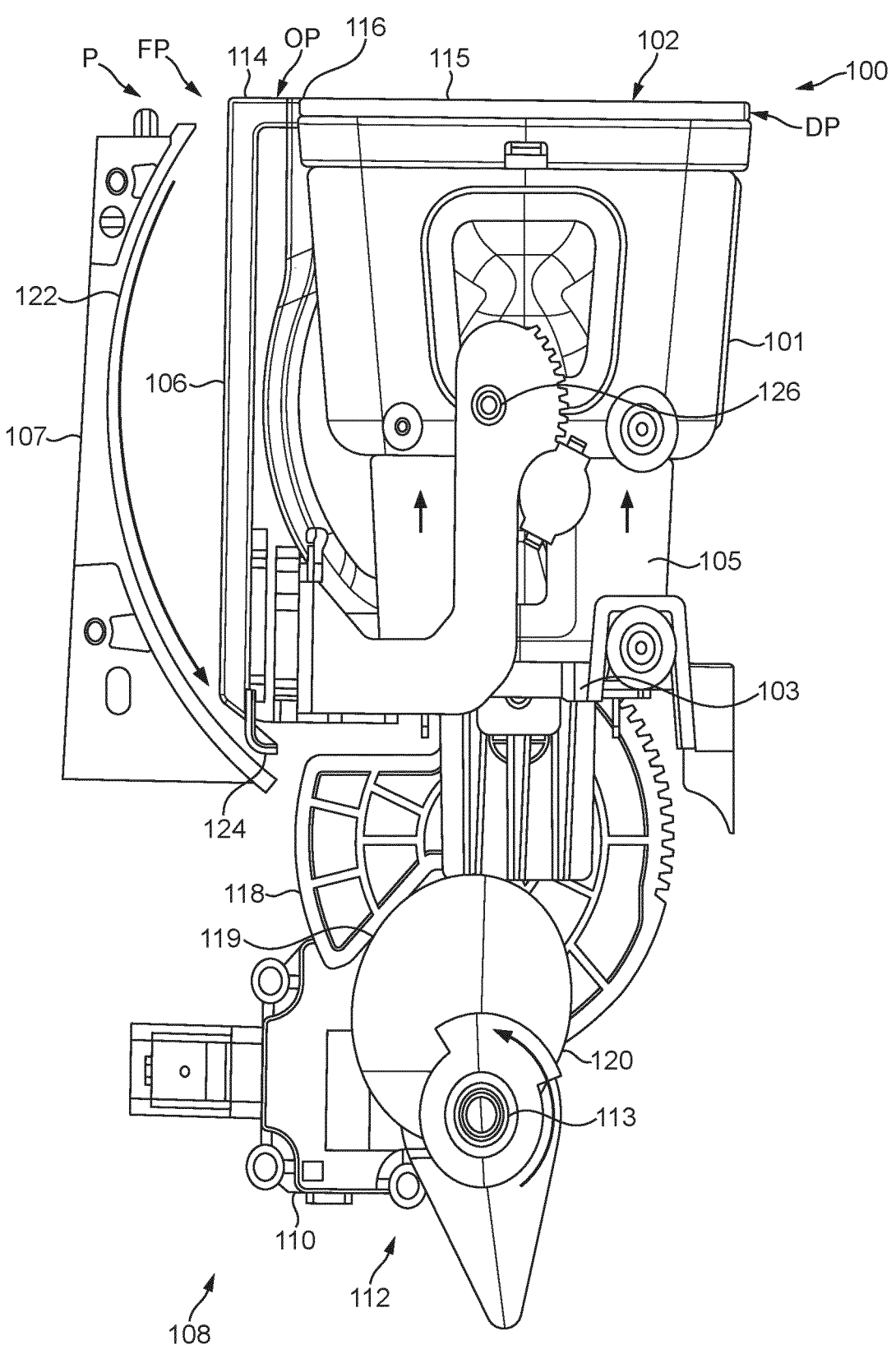
FIG. 10 illustrates the side cross-section view of the example cupholder system, wherein the lid is at the open position and the cupholder assembly is at the deployed position.

The lid mover 118 can comprise a gear mechanism or any other appropriate rotation device. The shaft 113 may rotate a gear mechanism. The lid mover 118 may be phased relative to the cupholder assembly mover 120, to open the lid 106 before deploying the cupholder assembly 101. The phasing may be achieved by various means, including but not limited to an intermittent rotary motion mechanism 119. As seen in FIGS. 8-10, the intermittent rotary motion mechanism 119 may comprise a pin secured to the shaft 113, engageable with a slot in a wheel of the gear mechanism to rotate the gear mechanism when so engaged.

Although not illustrated, the mechanism 112 may be further provided with one or more dampers and/or one or more springs to damp motion of the lid 106 and/or the cupholder assembly 101 close to their respective ends of travel.

In some examples, the cupholder system 100 further comprises an object retention device. This ensures that any loose objects resting on the exterior surface of the lid 106 are not 'swallowed' when the lid 106 is moved to the open position OP.

FIGS. 8-10 further illustrate an example implementation of the object retention device, relying upon a static object retainer surface 122. As the lid 106 rotates down to the upright orientation, the second edge 124 of the lid 106 sweeps along the object retainer surface 122 at a substantially constant separation distance. The substantially constant separation distance may have a value selected from the range zero millimetres to two millimetres. The distance is small enough that loose objects of typical size (e.g., cards, coins, paperclips) cannot slide therethrough. The second edge 124 of the lid 106 may comprise a deformable member such as a rubber seal, compressible to maintain sliding contact between the lid 106 and the object retainer surface 122.

The object retainer surface 122 is a curved surface having a radius of curvature from a centre of curvature. The centre of curvature may be parallel to an axis of rotation 126 of the lid 106. The centre of curvature of the object retainer surface 122 may substantially lie on the axis of rotation 126 of the lid 106.

The radius of curvature of the object retainer surface 122 is substantially the same as or slightly greater than (but not less than) a radius of the second edge 124 of the lid 106 from the axis of rotation 126 of the lid 106. The difference in radii (if any) is the distance of the aforementioned separation.

The curve length of the object retainer surface 122 may be sufficiently long that the second edge 124 of the lid 106 is against the object retainer surface 122 at the open position OP of the lid 106. Therefore, even when the lid 106 is upright/vertical, loose objects are still retained in the cavity space between the lid 106 and the object retainer surface 122. This can be seen in FIGS. 9-10. This ensures that when the lid 106 is closed next time, the loose objects will still be on the lid 106.

For intermediate positions of the lid 106, the second edge 124 of the lid 106 remains at the substantially constant distance from the object retainer surface 122 so ensure that gaps do not open up during the actuation of the lid 106 that may enable objects to fall through. This can be seen in FIG. 8.

The controller 400 may further comprise an anti-stall feature to interrupt movement of the lid 106 in response to detection of interference against moving the lid 106 to the open position OP. Detecting the interference may comprise, for example, detecting a load on the actuator 110. If the load increases above a threshold, it implies that the movement is blocked. The anti-stall feature may also work for closing of the lid 106, for example in case any large cups protrude beyond the first plane P and block the closing of the lid 106.

If the movement of the lid 106 is interrupted, the lid 106 may remain at a position that the lid 106 was in when the interruption was first initiated. Alternatively, following the interruption the controller 400 may control the actuation system 108 to move the lid 106 at least a small distance in a reverse direction without user intervention.

In response to the interruption detected by the anti-stall feature, the controller 400 may be configured to leave the lid 106 in a partially open position until a resume signal is received. This enables a user to reach into a space between the underside of the lid 106 and the cupholder assembly 101, to retrieve any loose objects. The resume signal may be initiated by user actuation of one of the user input controls as described herein.

With reference to the preceding description, the sequence of actuation is now summarised with reference to FIGS. 3-10.

Figure 7:
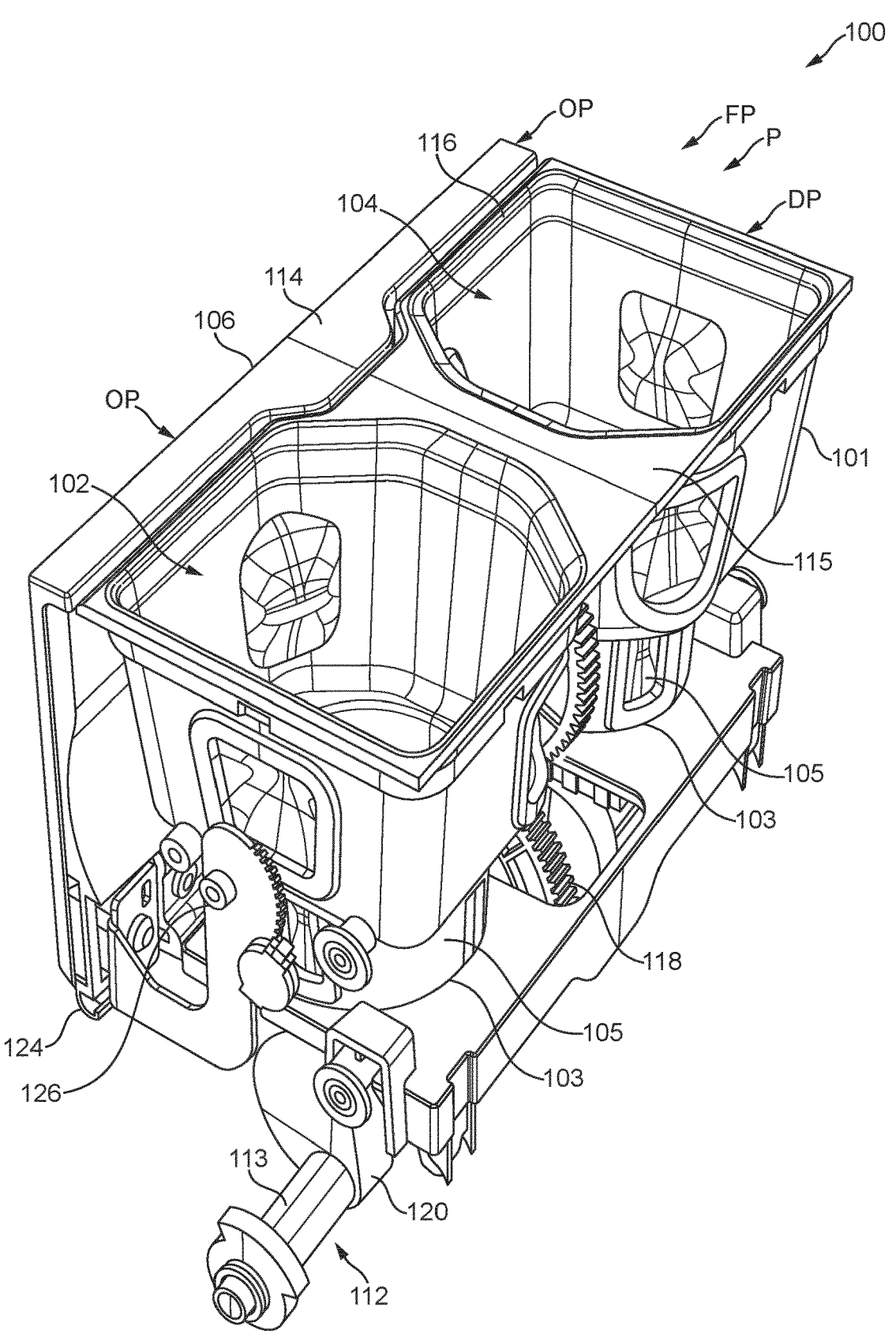
FIG. 7 illustrates a front perspective view of FIG. 6.

FIGS. 3-7 illustrate perspective views of the cupholder system 100. In FIG. 3, the cupholder assembly 101 is at the stowed position SP and the lid 106 is at the closed position CP. In FIG. 4, the lid 106 is at an intermediate position between the closed position CP and the open position OP, while the cupholder assembly 101 is still at the stowed position SP. In FIG. 5, the lid 106 is at the open position OP while the cupholder assembly 101 is at an intermediate position between the stowed position SP and the deployed position DP. In FIGS. 6 and 7, the cupholder assembly 101 is at the deployed position DP while the lid 106 is still at the open position OP.

FIGS. 8-10 illustrate the same sequence of events but from a side cross-section view. In FIG. 8, the lid 106 is at an intermediate position between the closed position CP and the open position OP, while the cupholder assembly 101 is at the stowed position SP. In FIG. 9, the lid 106 is at the open position OP while the cupholder assembly 101 is still at the stowed position SP. In FIG. 10, the cupholder assembly 101 is at the deployed position DP while the lid 106 is still at the open position OP.

For purposes of this disclosure, it is to be understood that the controller(s) described herein can each comprise a control unit or computational device having one or more electronic processors. A vehicle and/or a system thereof may comprise a single control unit or electronic controller or alternatively different functions of the controller(s) may be embodied in, or hosted in, different control units or controllers. A set of instructions could be provided which, when executed, cause said controller(s) or control unit(s) to implement the control techniques described herein (including the described method(s)). The set of instructions may be embedded in one or more electronic processors, or alternatively, the set of instructions could be provided as software to be executed by one or more electronic processor(s). For example, a first controller may be implemented in software run on one or more electronic processors, and one or more other controllers may also be implemented in software run on one or more electronic processors, optionally the same one or more processors as the first controller. It will be appreciated, however, that other arrangements are also useful, and therefore, the present disclosure is not intended to be limited to any particular arrangement. In any event, the set of instructions described above may be embedded in a computer-readable storage medium (e.g., a non-transitory computer-readable storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable program-mable memory (e.g., EPROM and EEPROM); flash memory; or electrical or other types of medium for storing such information/instructions.

It will be appreciated that various changes and modifica-tions can be made to the present invention without departing from the scope of the present application.

Although embodiments of the present invention have been described in the preceding paragraphs with reference to various examples, it should be appreciated that modifica-tions to the examples given can be made without departing from the scope of the invention as claimed.

For example, the cupholder assembly 101 can be located elsewhere than the vehicle centre console 2 and accordingly may have a differently shaped surfaces to ensure a flush finish, and/or may comprise a different number of cuphold-ers, and/or may move in a different way. Further, the definition of a flush finish has a degree of tolerance associ-ated therewith, with regard to positional offset and angular offset.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A cupholder system for a vehicle, the cupholder system comprising:
   a cupholder assembly comprising a first cupholder open-ing;
   a lid configured to, when in a closed position, cover at least the first cupholder opening, and when in an open position, uncover the first cupholder opening;
   an actuation system configured to, in dependence on an electrical signal, deploy the lid in a first rotational path to the open position and deploy the cupholder assembly in a second path from a stowed position to a deployed position; and
   an object retainer surface curved so that in use as the lid rotates between the closed position and the open position, a proximal edge of the lid proximal to the object retainer surface moves at a substantially con-stant distance from the object retainer surface, wherein when the lid is at the open position, the object retainer surface and the lid remain separated from each other by the substantially constant dis-tance.

2. The cupholder system of claim 1, further comprising an object retention device to retain loose objects resting on an exterior surface of the lid.

3. The cupholder system of claim 1, wherein the actuation system comprises a shared actuator and a mechanism con-figured to link the shared actuator to the lid and to the cupholder assembly.

4. The cupholder system of claim 1, wherein the first rotational path of the lid to the open position comprises rotation of the lid, and wherein the second path of the cupholder assembly comprises translation of the cupholder assembly.

5. The cupholder system of claim 1, wherein the lid in the closed position is at a flush position relative to a first plane, and wherein the first cupholder opening in the deployed position is substantially at the flush position.

6. The cupholder system of claim 1, wherein the lid in the closed position is above the cupholder assembly, wherein the first cupholder opening in the stowed position is below the lid, and wherein the first cupholder opening in the deployed position is above the stowed position.

7. The cupholder system of claim 1, wherein at the open position of the lid, an edge of the lid is substantially flush with an edge of the cupholder assembly at the deployed position.

8. The cupholder system of claim 1, comprising a con-troller configured to, during movement of the lid to the open position, detect an interference against moving the lid to the open position, and to interrupt movement of the lid in response to the detection.

9. The cupholder system of claim 8 wherein interrupting movement of the lid comprises leaving the lid in a partially open position until a resume signal is received.

10. The cupholder system of claim 1, wherein the cup-holder assembly comprises a second cupholder opening, wherein the lid in the closed position further covers the second cupholder opening, wherein the lid in the open position exposes the first and second cupholder openings, and wherein deployment of the cupholder assembly causes at least the first and second cupholder openings to move.

11. A vehicle centre console comprising the cupholder system of claim 1.

12. The vehicle centre console of claim 11, comprising a user input device section located aft of the cupholder system, closer to a seat than the cupholder system.

13. A vehicle comprising the cupholder system of claim 1.

14. The cupholder system of claim 1, wherein the sub-stantially constant distance has a value of less than two millimetres.

15. The cupholder system of claim 1 wherein the proximal edge of the lid adjacent the object retainer surface comprises a deformable member which is compressible to maintain sliding contact between the lid and the object retainer surface.

16. The cupholder system of claim 1 wherein the object retainer surface is a curved surface having a radius of curvature from a centre of curvature, the centre of curvature parallel to an axis of rotation of the lid.

17. The cupholder system of claim 16 wherein the centre of curvature of the object retainer surface lies substantially on the axis of rotation of the lid.

18. The cupholder system of claim 1 wherein a curve length of the object retainer surface is dimensioned such that the proximal edge of the lid adjacent the object retainer surface is against the object retainer surface at the open position of the lid.

* * * * *